United States Patent
Schulz

(12) 
(10) Patent No.: US 6,978,081 B1
(45) Date of Patent: Dec. 20, 2005

(54) CONTINUOUS LOOPING FEATURE IN TRANSMISSION OF HDTV SIGNALS

(75) Inventor: Rodney Schulz, Sioux Falls, SD (US)

(73) Assignee: Sencore, Inc., Sioux Falls, SD (US)

( * ) Notice: Subject to any disclaimer, the term of this patent is extended or adjusted under 35 U.S.C. 154(b) by 838 days.

(21) Appl. No.: 09/657,030

(22) Filed: Sep. 7, 2000

Related U.S. Application Data

(60) Provisional application No. 60/152,738, filed on Sep. 8, 1999, provisional application No. 60/152,737, filed on Sep. 8, 1999.

(51) Int. Cl.[7] .............................................. H04N 5/91

(52) U.S. Cl. ...................... 386/46; 386/125; 348/588

(58) Field of Search ............................ 386/1, 33, 6–8, 386/45, 68–69, 81–82, 108, 111–112, 124–126, 386/46; 348/564, 565, 567, 588

(56) References Cited

U.S. PATENT DOCUMENTS

| | | | | |
|---|---|---|---|---|
| 5,594,509 A | * | 1/1997 | Florin et al. ................ 348/565 |
| 6,112,007 A | * | 8/2000 | Kram .......................... 386/46 |
| 6,141,486 A | * | 10/2000 | Lane et al. ................... 386/68 |
| 6,504,990 B1 | * | 1/2003 | Abecassis .................... 386/46 |
| 6,539,548 B1 | * | 3/2003 | Hendricks et al. .......... 725/109 |

* cited by examiner

Primary Examiner—James J. Groody
Assistant Examiner—Christopher Onuaku
(74) Attorney, Agent, or Firm—Patnaude & Videbeck

(57) ABSTRACT

A high definition television player records and plays back HDTV signals in a closed circuit to demonstrate high definition television. The signals are recorded on a hard drive, CD, DVD or the like in discrete 2-meg data blocks, with each block of data being separately identified. The invention provides for continuous looping play of a desired program or programs by identifying the starting data block and ending data block of the program. The program play is begun at the starting block. When the program is finished at the end block, play continues at the start block, and so on until the stop button is pushed.

2 Claims, 7 Drawing Sheets

SINGLE PROGRAM LOOP

PLAY ALL OR PLAY SEQUENCE LOOP

CONTINUOUS LOOPING FEATURE IN TRANSMISSION OF HDTV SIGNALS

This invention relates to apparatus and methods for receiving and storing and sending HDTV (high definition television) signals and, more particularly, to an apparatus and method for providing a continuous looping play feature while transmitting those signals to display televisions in retail store outlets. This application is a provisional of 60/152,738 filed Sep. 8, 1999 and Ser. No. 60/152,737 filed Sep. 8, 1999.

BACKGROUND OF THE INVENTION

The change from analog electronic circuitry to digital electronic circuitry in the consumer electronics industry has brought about wide spread change in the products utilized by consumers. Examples of this change can be seen in personal computer and digital telephone circuitry. In the personal computer field, data storage apparatus in the form of hard disk drives and DVD (digital versatile disks) drives have allowed consumers to store massive amounts of digital data and have the ability to send that data to various display apparatus. The use of digital electronic technology has also enabled the advent of high definition television (HDTV) which will provide televisions with better picture quality, better viewing aspect ratio, and larger viewing screens.

After years of development, high definition television (HDTV) sets are now being sold. These new sets receive digital signals and produce a much sharper, static free picture. However, the new technology also comes with a much higher price tag. HDTV sets currently are sold in a price range from about $4,000 to $10,000 each. In order to sell these HDTV sets, it is imperative for the television dealers to show to the purchasing public the dramatic improvement in picture quality over standard analog sets.

The best means of operational display of the new HDTV sets would be to simply receive a digital TV broadcast from a local television station. Unfortunately, at the present time, there are only a handful of stations broadcasting digital TV to the nation's largest markets. Even these broadcasts are mostly limited to prime time viewing hours or special events. This method is simply not yet available to most of the nation most of the time.

Another way to display the new HDTV sets in operation is with a satellite feed. This technology can be very expensive, and is still not the best means to demonstrate the new sets because the content of the satellite broadcast may not be the best material for showing the sharper images produced by the new sets. Interference from weather and atmospheric conditions can also be a problem. The retailer also has to accept whatever signal is being sent by the satellite and the retailer does not have the ability to show material especially developed to demonstrate the features of HDTV.

The best solution for the retailer is to have a "box" in the store with pre-recorded high definition content that the sales person can play to customers to demonstrate their sets. One means of pre-recording material involves recording the HD material on a tape for the retailer to play back on a digital VCR. Because of the extremely large amount of information that needs to be stored and played back at a very high rate of speed, these tape decks and their tapes are far more complex and expensive than a standard analog VCR. But the biggest disadvantage with using a tape is the downtime required to rewind the tape when it reaches the end. Also, the HDTV player could not be left unattended to catch the eye of the passerby. The tape would simply reach the end and stop playing unless someone was there to rewind or change the tape. Besides being an inconvenience and a burden, it has resulting downtime and ineffectiveness built into it.

A need has arisen to provide an inexpensive means of providing a continuous looping feature useful while demonstrating HDTVs, at least until television broadcast stations are continually running HDTV broadcast signals.

It is an objective of the present invention, generally stated, to provide a continuous looping play feature in an HDTV player for sending HDTV format signals in a closed circuit to HDTVs.

More particularly, it is a further objective of the present invention to provide a continuous looping play feature with an HDTV player utilizing a hard disc drive, or a DVD drive, for storing and retrieving video data and converting it to 8-VSB format for use in a closed circuit to demonstrate and/or service HDTVs.

SUMMARY OF THE INVENTION

The invention resides in a continuous looping play feature in a high definition TV player capable of utilizing at least one of a hard disk drive and a DVD drive as the media for storing the audio and video content of HDTV programming. In order to utilize the hard disk drive or the DVD drive for continuous looping of selected portions of the storage media, video data must be storable therein, and retrieved by the player which converts it to the 8-VSB modulation format used to provide signals to HDTVs. The signals are converted in two megabyte segments. The segments are numbered and the looping feature when reaching the end numbered segment moves to the start numbered segment.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings wherein like reference numerals identify like elements throughout and in which:

FIG. 7 is a front elevational view of the HDTV996 VSB player having increased flexibility in selecting the amount and sequence of material to continuously loop through;

DETAILED DESCRIPTION OF THE PREFERRED EMBODIMENT

Figure 1:
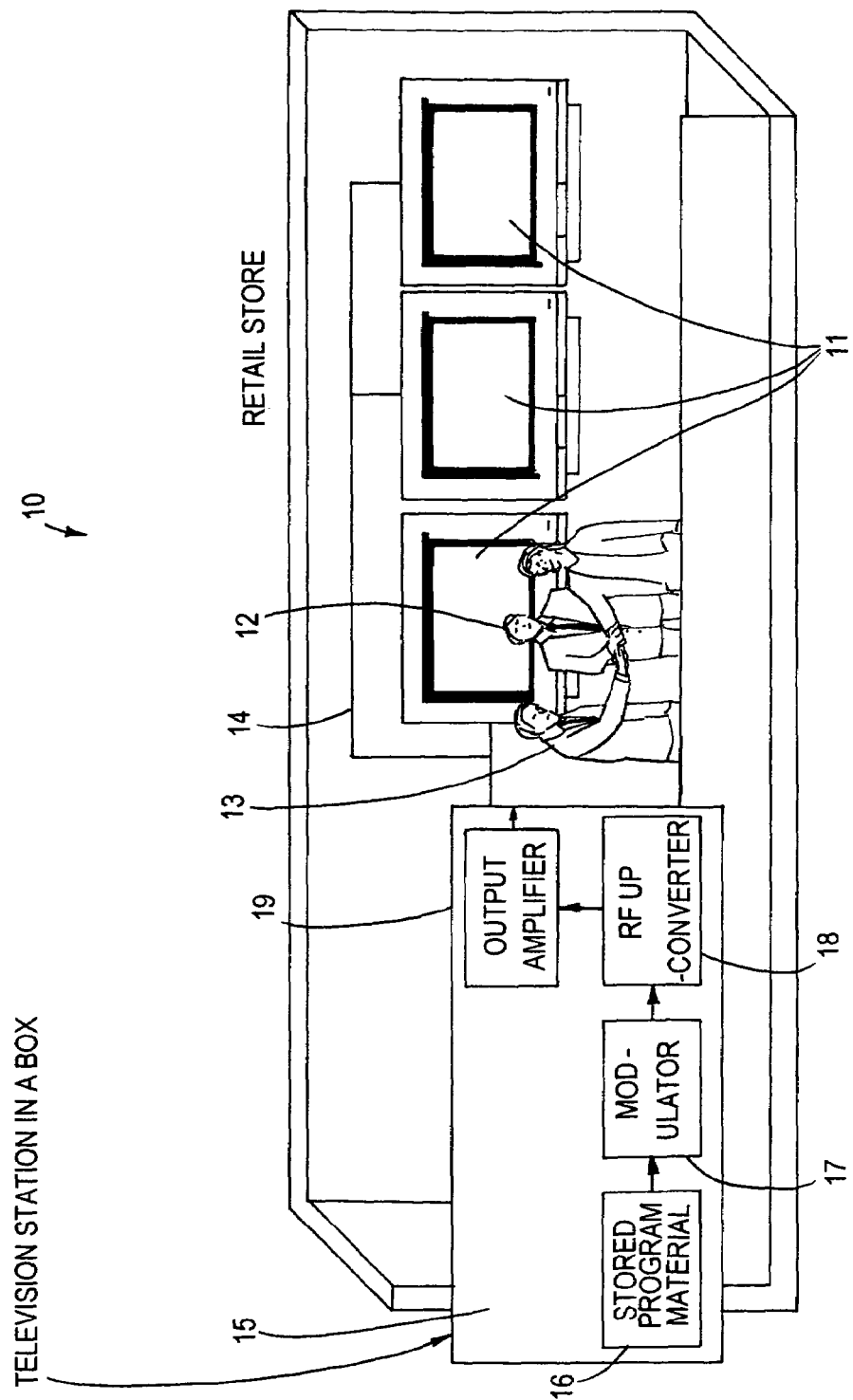
FIG. 1 is a diagrammatic view of the continuous looping display HDTV player of the present invention shown sending an HDTV compatible signal through a closed circuit to televisions on display in a retail store.

Referring to FIG. 1, a diagrammatic view of a retail appliance store is shown generally at 10, and it includes a plurality of television sets 11—11 which may be viewed by customers 12 and demonstrated by a salesman 13. In this embodiment, each of the televisions 11 is sent a signal in a closed circuit 14 from the HDTV player including a continuous looping play feature, generally indicated at 15, shown in block diagram, and identified as a television station in a box. The HDTV player 15 includes apparatus for storing program material 16. Apparatus 16 may be a hard disk drive, a DVD drive or the like. Data containing the audio and digital signal is placed in this medium. This is the stored program material. This data is retrieved from the storage medium 16 and modulated to a base band signal by the modulator 17. The radio frequency up-converter 18 converts this base-band signal to an RF (radio frequency) signal. Finally, the RF signal is amplified and sent to the output by the output amplifier 19. This RF signal is then connected to an HDTV 11—11 where it is demodulated, decoded, and displayed.

Figure 2:
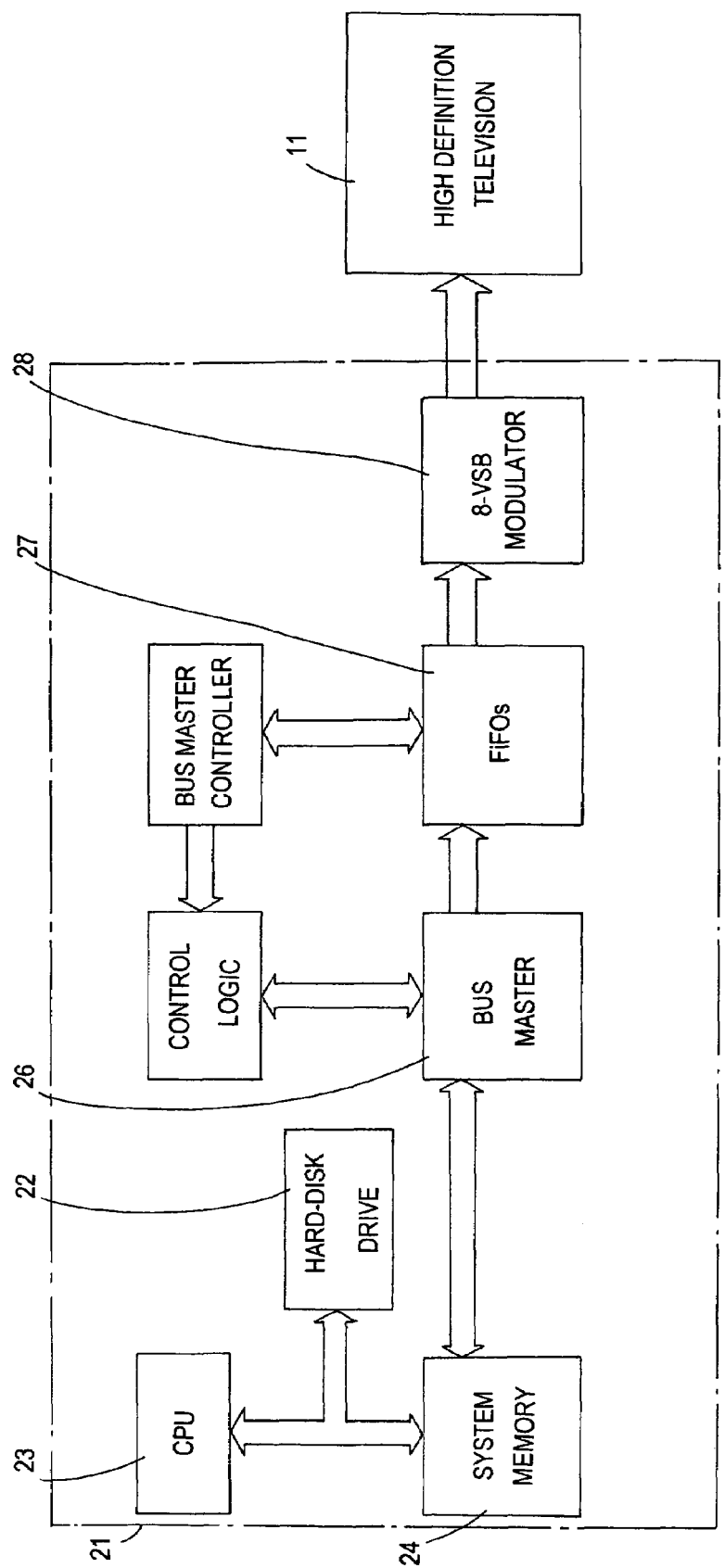
FIG. 2 is a block diagram of a first embodiment of the present invention.

Referring to FIG. 2, a more detailed block diagram of the data storage and transmitting operation with a continuous looping play feature of the first embodiment is generally indicated at 21. In this embodiment, this device may be called an HDTV player 21. The audio and video information is stored on the hard drive 22, which may be either a hard disk drive as utilized in present personal computers, or a digital versatile disk drive, which may also be used in computers or to show movies on a present generation television. This information is retrieved from the hard drive 22 by CPU 23 (central processing unit) and stored in two 2-megabyte blocks on the system memory 24. The CPU numbers identify each of the 2-megabyte blocks it stores on the system memory. The CPU also includes software that stores the identification of the start and finish blocks and moves to lay the start block as soon as the finish block has been displayed. The bus master controller 25 controls the flow of data from the system memory 24, through the bus master 26 to the FIFOs (first-in, first-out registers) 27. The bus master 26, under control of the bus master controller 25, copies 1 K byte blocks from one of the 2-megabyte blocks in the system memory 24 into the FIFOs 27. After the block of data is copied to the FIFOs 27, the bus master 26 reads data from the other 2-megabyte block in the system memory 24. While the bus master 26 reads from the second block of system memory 24, the CPU 23 reads more data from the hard disk drive 22 and fills the first block of data in system memory 24 and identifies that individual block.

After reading from one block of data in system memory 24 while the other is being filled, a constant flow of data is maintained into the FIFOs 27. This provides the 8-VSB modulator 28 of a constant flow of data from the FIFOs 27. The 8-VSB modulator 28 encodes the data, and then converts the incoming data into one of eight voltage levels. This is the base band signal that is used to modulate the radio frequency carrier. This signal can be connected directly to a high definition television 11. The HDTV demodulates and converts the 8-VSB signal into audio and video. The continuous looping feature in the CPU stops play after displaying, identifying finish block of data, and almost instantaneously starts play at the identified start block on the medium of data storage.

Figure 3:
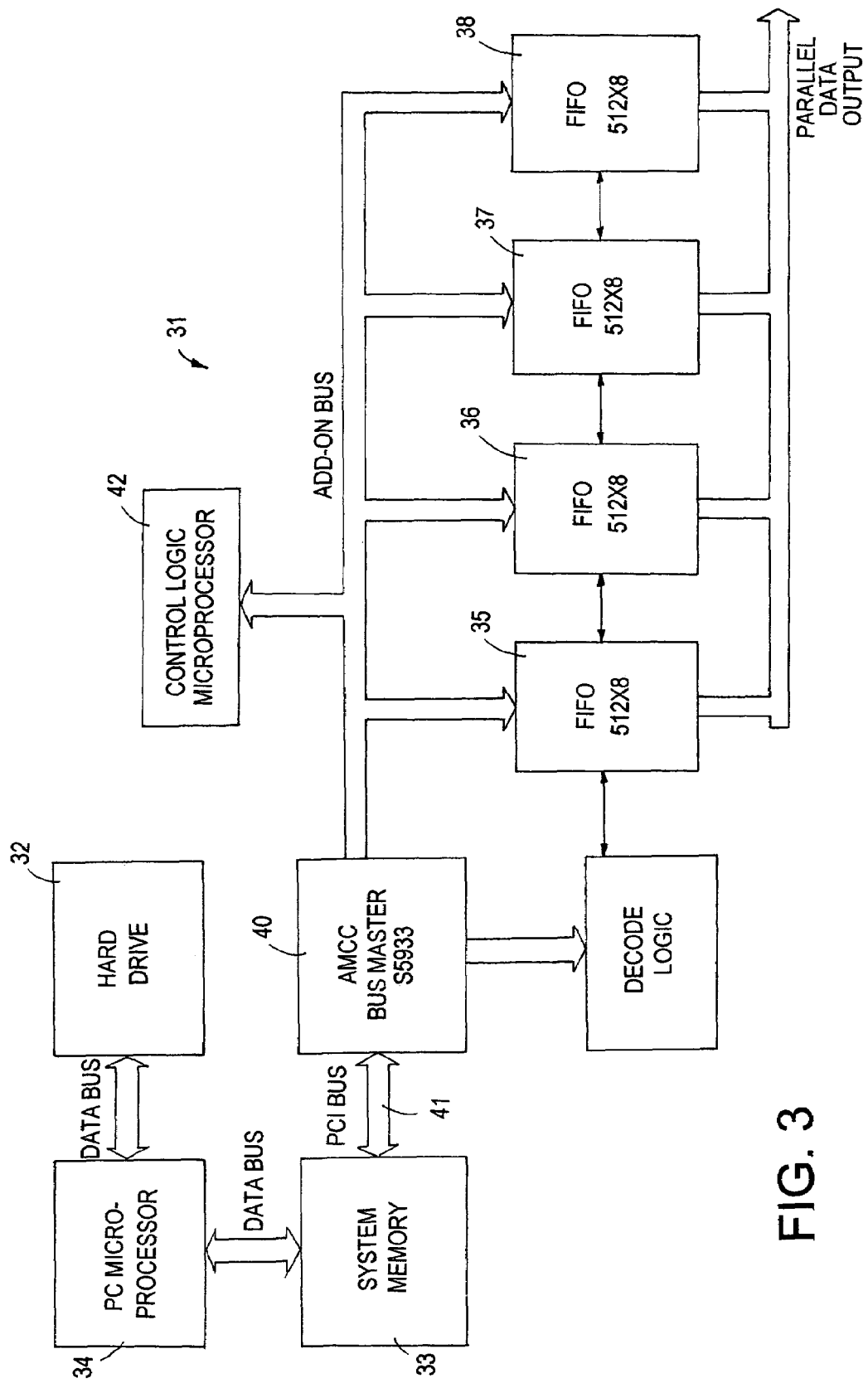
FIG. 3 is a block diagram of a second embodiment of the present invention.
Figure 4:
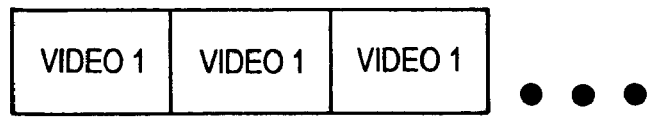
FIG. 4 is a diagrammatic view and shows how a singular video clip can be played continuously over and over.
Figure 5:
FIG. 5 is a diagrammatic view and shows how a sequence of video clips can be set up to loop (play) continuously.
Figure 6:
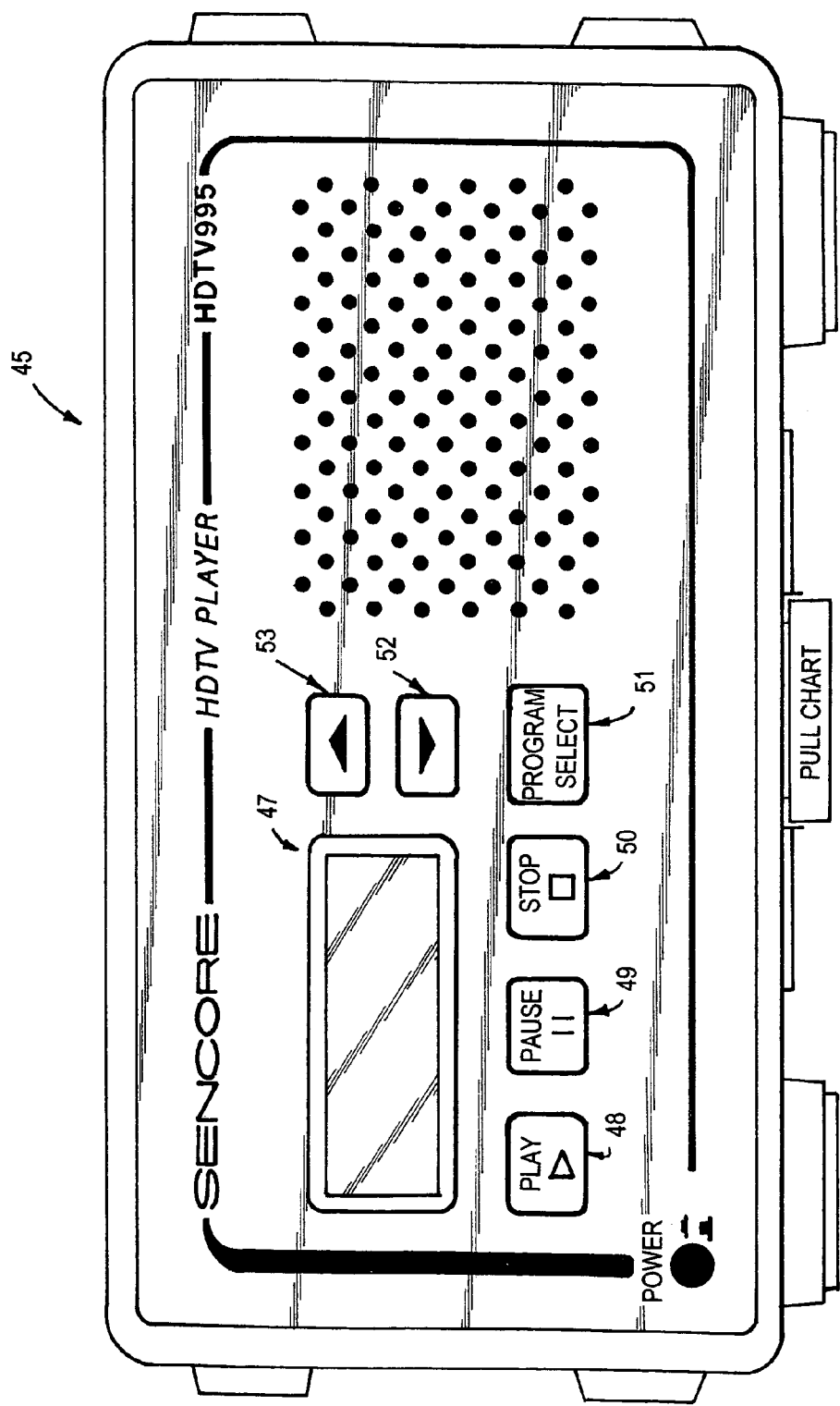
FIG. 6 is a front elevational view of the HDTV995 HDTV player featuring basic continuous play looping.

Referring to FIG. 3, a second embodiment of the television station in a box, including continuous looping play feature, is generally indicated at 31. Compressed video and audio information in this embodiment is stored on a hard drive 32, which similarly to the hard drive 22 of the first embodiment may be a hard disk drive or a digital versatile disk. Compressed digital video and audio information is stored on the hard drive 32 in either the MPEG-2 compressed format or in a pre-encoded format. The pre-encoded format includes proprietary pre-processing of the MPEG data to ease the requirements of the 8-VSB modulator (not shown) and provides a level of copy protection to the system.

One of the main requirements of the data transfer is to re-clock the output data at a fixed rate required by the parallel interface and the modulation standard. Data retrieved from the hard drive 32 is not presented at a fixed rate. The transfer of data from the hard drive 32 to the memory 33 is controlled by the computer's microprocessor 34 and is continually interrupted as the microprocessor 34 services other tasks and subroutines. Therefore, a buffer that allows data to be written at one rate and read at another is needed. This is accomplished with FIFO memory, generally indicated at 35–38, which has two separate ports for the input (written) data and the output (read) data. There is a separate clock for each data port.

The entire reclocking process is handled in two steps. The first step occurs when the microprocessor 34 moves the data into two concurrent 2Meg blocks of system memory 33. In accordance with the invention, the microprocessor distinctly identifies or numbers each 2Meg block of memory. It initially fills both sections and then waits until one block is emptied by the reading process. As the read pointer transitions into the second block of system memory 33, the microprocessor 34 is notified to refill the first block. The refill cycle of the first block can be completed faster than the second block is emptied. This cycle of refilling the empty blocks continues until the system is stopped by the control circuitry. The next step is performed by four 512-byte blocks of FIFO memory 35–38. The second stage adds another level of buffering to the system memory 33 and provides another important step. Data in the hard drive 32 and system memory 33 are stored and manipulated in 32 bit wide words. The output of this system must be 8 bits wide. The 32 bit words from the system memory 33 are distributed across the four 8 bit FIFO's 35–38 by a bus master device 40 via the PCI bus 41. In the same manner as the system memory 33, the bus master 40 and separate control logic microprocessor 42 break each FIFO 35–38 into two sections. The sections are refilled as the read pointer transitions across the half full boundary of each device. The output is then taken sequentially from each of the 8 bit FIFOs 35–38 at the required rate and width.

The control logic maintains a constant flow of data to the output at one of two rates:
19.392658 megabits per second or 2.424082 megabytes per second.
21.524475 megabits per second or 2.690559 megabytes per second.

The 19.392658 megabits per second rate is the bit rate for the MPEG transport stream. This is the output data when the raw MPEG data is stored on the hard drive 32. The 21.524475 megabits per second rate is the bit rate required when the MPEG data is pre-encoded. This rate takes into account the data overhead required to store the Reed-Solomon error correction data and the additional field syncs.

The CPU 34 includes instructions regarding identifying a start block and a finish block in any single sequence or multiple sequences of memory representing the HDTV program a user wants to display on screens in the show room. Upon choosing the start and stop positions (2Meg blocks), when the HDTV player reaches the finish block it will automatically, almost instantaneously return to the designated start block and continue playing.

Two different input and output standards are supported by this system, including TTL and LVDS. Input and output buffers are also included to convert the data ports. One additional buffer is used to transfer the data to another system board that develops the 8VSB-modulated signal.

This transfer method provides a cost effective means of retrieving video data that has been stored on a consumer type hard drive and produces a fixed rate data interface for the MPEG transport system.

Applicant's present continuous looping play invention, as shown in both embodiments, provides a new and improved means for uninterrupted continuous play of working HDTV's 11 when there is, as yet, no television broadcast stations in the nation that are continually running with HDTV broadcast signals. The present invention provides an inexpensive means of continuously demonstrating high definition TVs. It may be loaded with HDTV program material or user created program material for the purpose of showing the capabilities of the HDTV technology. It is essentially a television broadcast station in a box 15. It will provide all that a television station would provide if it were available. In fact, it is a much more flexible means of demonstrating HDTV. It can be completely controlled by a salesperson 13 allowing him or her to change the program material for the customer 12. This is something one could not do with a broadcast HDTV signal.

Referring to FIGS. 6–9, the front panels of the HDTV 995 and HDTV 996 are shown generally at 45 and 46, respectively. HDTV 995, 45, is the model described in the first embodiment described above, and HDTV 996, 46, is described in the second embodiment above. HDTV 995, front panel 45 includes a display panel 47 and play 48, pause 49, stop 50, program select 51 and up and down scroll buttons, 52 and 43, respectively.

Figure 8:
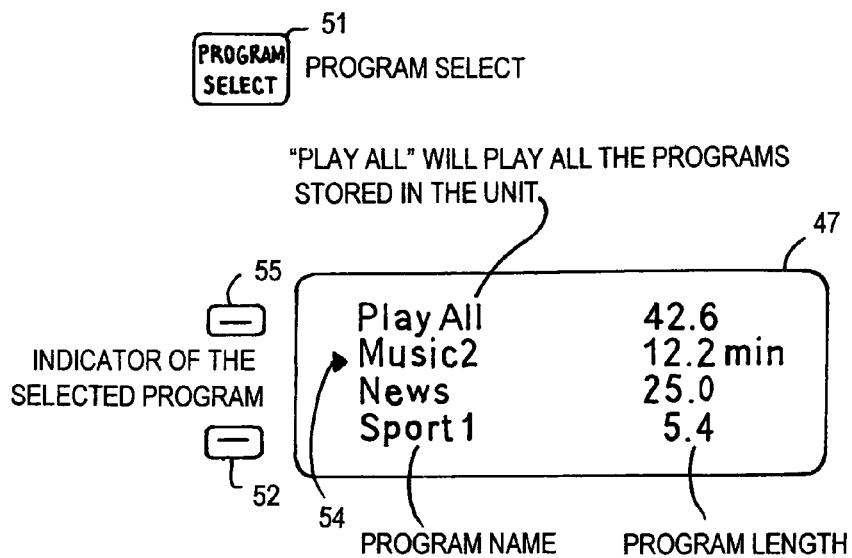
FIG. 8 is a front detail elevational view of a first readout display shown in FIG. 7.
Figure 9:
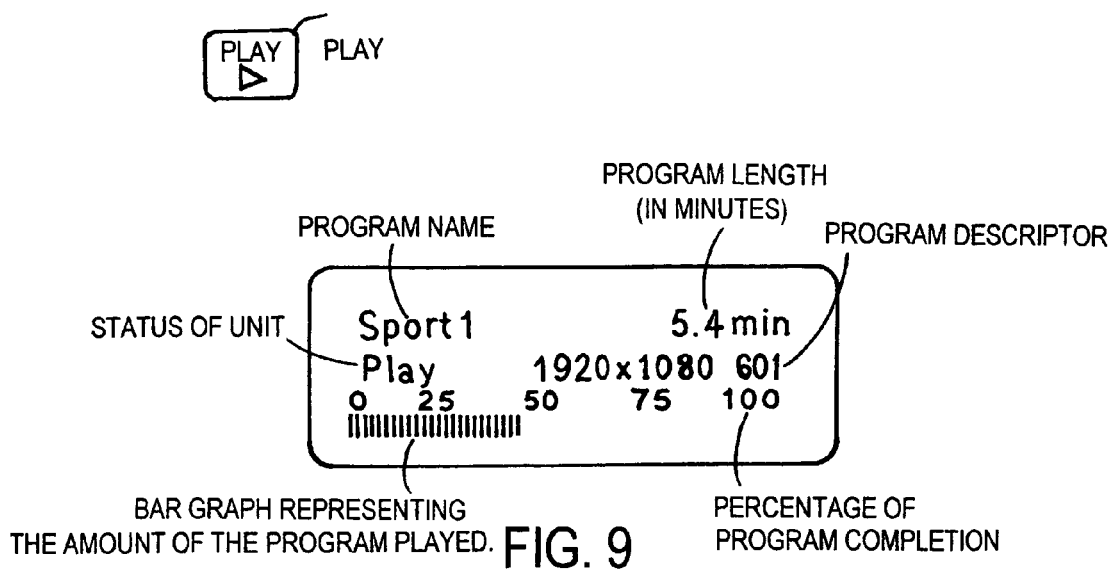
FIG. 9 is a front detail elevational view of a second readout display shown in FIG. 7.

Referring to FIGS. 8 and 9, when the program select button 51 is pushed, the display panel shows all of the programs stored in the unit. Displaying the program name and the length of play. The up and down scroll buttons 53, 52, respectively, scroll the programs on the display panel.

When the program to be played is aligned with the arrow 54, the play button may be pushed. The display 49 will change to a display similar to that shown in FIG. 9. The continuous looping feature of the present invention provides for continuous replaying of the designated program until the stop button is pushed.

Figure 7:
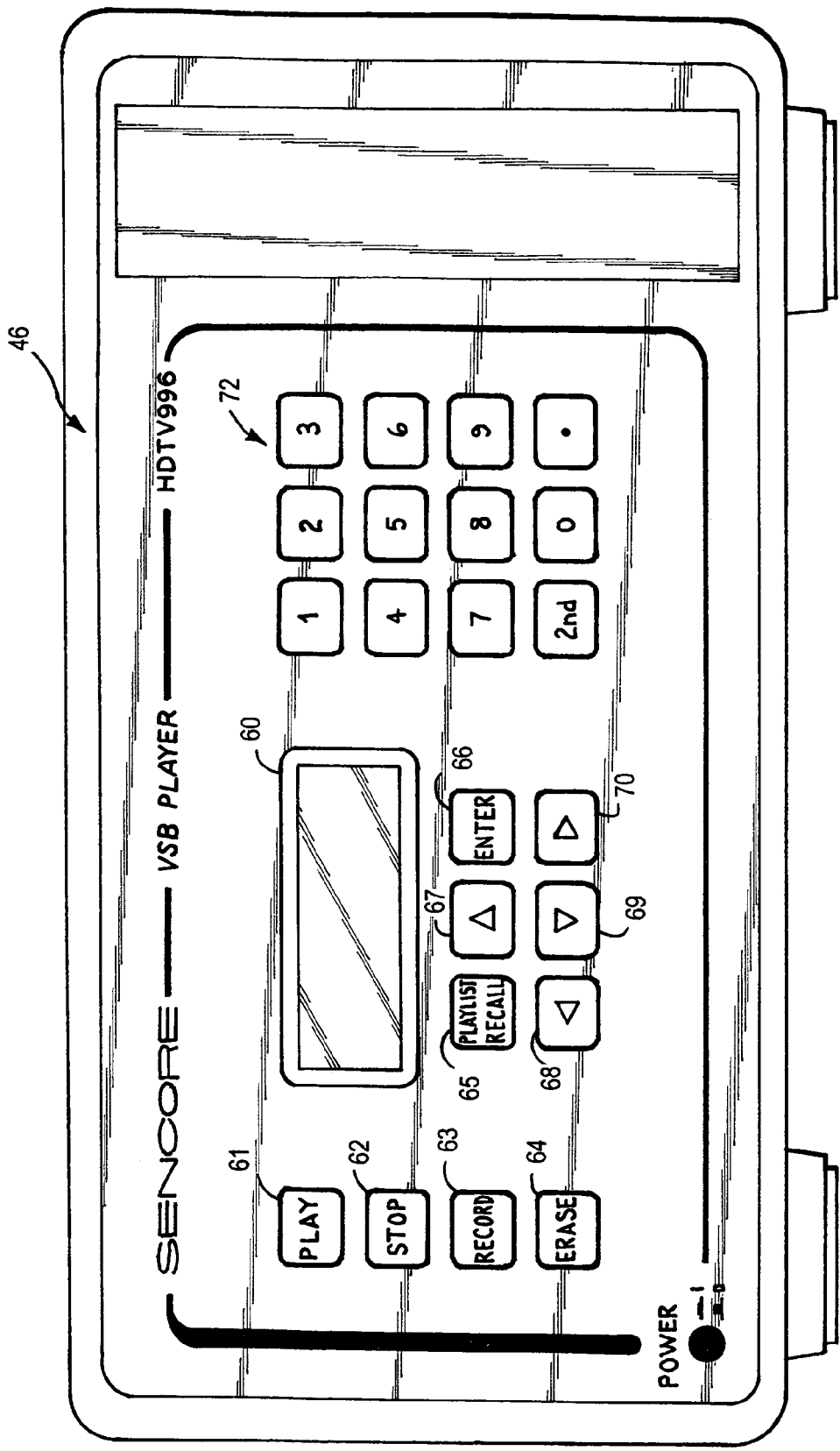

Referring to FIG. 7, the front panel 46 for the HDTV 996 is shown, and includes a display panel 60, and play button 61, stop button 62, record button 63, erase button 64, play list recall button 65, enter button 66, and directional buttons up 67, left 68, down 69, and right 70. To the right of the display is a set of 12 telephone pattern buttons 72. The operation of the HDTV 996, 46 is conducted as follows:

Selecting a Program or Group of Programs

The HDTV 996 offers 4 modes of playback, "play all," "play sequence," "play loop" and a single program play. Each mode allows flexibility in selecting the programs to be played. When the HDTV 996 is playing a program or group of programs both the 8-VSB and both parallel outputs (TTL and LVDS) are active. Depending on the switch setting, the 8-VSB output will be channel 14 or 15.

V-1 Play All

"Play all" will play all the programs loaded on the unit in an alphabetic order sequence and loop back to the first program when all the programs are done playing. The number next to the "play all" display represents the total play time of the programs loaded on the unit. To "play all" use the up and down arrow to select "play all" and press the play button 61. Note, when the "play all" is in use an * is displayed next to "play" on the VDF screen. When all the programs are complete, the unit loops back to the first program and starts the sequence again.

V-2 Play Seq.

"Play Seq." creates and plays a sequence of programs on the HDTV 996. To create a sequence, use the up and down arrow to select "play seq" and press enter 66. An * will appear next to the "play seq" indicating that the play sequence function is selected. To select a program, use the up and down arrow to select (by pressing enter) for each program in the sequ4nce. The programs will be played in the order in which they were selected. When a program is selected for the sequence play, a number indicating its position in the sequence is displayed next to the program. To de-select the program press on enter 66 again in front of the program that you want to remove from the sequence. The number next to the "play seq" display represents the total time of the programs selected in the sequence. Note, the maximum number of programs in the "play seq" mode is 9 programs unless activated from the optional remote control software. To "play seq" use the up and down arrow to select "play seq" and press play 61. When all the programs in the sequence are done playing, the unit loops back to the first program and repeats the sequence.

V-3 Play Loop

"Play loop" plays a predefined portion of a program. To create a loop, use the up and down arrow to select "play loop" and press enter 66. An * will appear next to the "play loop" indicating that the play loop function is selected. Use the up and down arrows to select the program that you want to loop on and press enter 66. Use the right arrow to move the cursor and press enter 66 when the desired start point is reached. Use the right arrow to move the cursor and press enter 66 when the desired end point is reached. The "play loop" sequence will then start playing. Each increment of the cursor represents 1 percent of the total play time of the program. When the loop is done playing, the unit loops back to the start point of the loop and starts the "play loop" again. Note, when the play list button 65 is pressed, the loop start and stop points are erased.

V-4 Play Single Program

To play a single program, use the up and down arrow to select the program to play and press enter 66 or play 61. When the program is done playing, the unit loops back to the beginning of the selected program and starts again.

With the HDTV players of the present invention, retailers have an inexpensive means of demonstrating HDTV with program material specifically selected to show the superior quality of the new sets. HDTV players 996 and 995 give the user in-store control of the material being played at any given time for unmatched flexibility and selectability. The looping feature in the HDTV players allow them to play continuously, so they can be left unattended to show the HDTV sets without the need to stop and rewind tapes. They also provide uninterrupted demonstrations, with no time-consuming rewinds or tape changes that could break the continuity of a sales presentation and ultimately plague its effectiveness.

While two embodiments of the present invention have been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed is:

1. A method of storing and continuous looping transmission of digital HDTV signals comprising the steps of:
   copying a first block of digital HDTV signals from 1 of 2 distinct blocks in a computer system memory to first in, first out registers,
   identifying said first block of digital HDTV signals,
   copying a second block of digital HDTV signals from the other of said two distinct blocks in a computer system memory to be the first in, first out registers,
   identifying each of said distinct blocks of additional digital HDTV signals,
   providing said constant flow of digital HDTV signals from said first in, first out registers to an 8-VSB modulator,
   encoding said digital HDTV signals,
   converting said digital HDTV signals into one of 8 voltage levels for providing a base band signal that is used to modulate a radio frequency carrier,
   choosing one of said blocks of digital HDTV signals to be a start block and another one of said blocks of digital HDTV signals to be a finish block in a program to be transmitted,
   playing said blocks of digital HDTV signals from said start block to said finish block,
   continuously playing said blocks of digital HDTV signals in identified order with said start block positioned after said finish block in playing order.

2. A method of re-clocking digital HDTV signals and preparing same for continuous looping play comprising:
   filling two concurrent blocks of computer system memory with 32 bit wide digital HDTV signals and identifying the signals making up each distinct block thereof,
   emptying one of said two concurrent blocks by a reading process,
   emptying a second of said two concurrent blocks by a reading process while a microprocessor orders the refill of said first block at a faster rate than the emptying of said second block,
   distributing said 32 bit wide digital HDTV signal across four 8 bit first in, first out registers by a bus master device via a bus,
   dividing each first in, first out registers into two sections,
   refilling each section as each register transitions a half full boundary, and
   providing a constant predetermined rate and width digital HDTV signal sequentially in identifiable predetermined sized blocks of such signals from each of the four 8-bit first in, first out registers.

* * * * *